(12) United States Patent
Wilson et al.

(10) Patent No.: US 12,535,881 B2
(45) Date of Patent: Jan. 27, 2026

(54) EYE TRACKING DATA FILTERING

(71) Applicant: Apple Inc., Cupertino, CA (US)

(72) Inventors: Jacob Wilson, Cupertino, CA (US); Tobias Eble, Sunnyvale, CA (US); Sabine Webel, Sunnyvale, CA (US); Hariprasad Puthukkootil Rajagopal, Sunnyvale, CA (US); Andreas Gapel, Sunnyvale, CA (US); Ritesh Gangadhar Sholapur, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 434 days.

(21) Appl. No.: 18/056,526

(22) Filed: Nov. 17, 2022

(65) Prior Publication Data

US 2023/0305625 A1    Sep. 28, 2023

Related U.S. Application Data

(63) Continuation of application No. 17/809,734, filed on Jun. 29, 2022, now abandoned.
(Continued)

(51) Int. Cl.
  *G06F 3/01*   (2006.01)
  *G06V 10/44*  (2022.01)
  (Continued)

(52) U.S. Cl.
  CPC .............. *G06F 3/013* (2013.01); *G06V 10/44* (2022.01); *G06V 40/19* (2022.01); *G06V 40/193* (2022.01)

(58) Field of Classification Search
  CPC ........ G06F 3/013; G06V 40/19; G06V 10/44; G06V 40/193
(Continued)

(56) References Cited

U.S. PATENT DOCUMENTS 5,481,622 A      1/1996  Gerhardt
10,546,364 B2 *  1/2020  Bastani ................... G06T 19/00
(Continued)

FOREIGN PATENT DOCUMENTS

JP     2020513580 A     5/2020

OTHER PUBLICATIONS

Hansen, John Paulin, et al. "A gaze interactive assembly instruction with pupillometric recording." Behavior research methods 50 (2018): 1723-1733. (Year: 2018).*
(Continued)

*Primary Examiner* — Jonathan S Lee
(74) *Attorney, Agent, or Firm* — Blank Rome LLP

(57) ABSTRACT

Eye tracking is performed by determining an initial pupil position of a user in relation to a lens situated in front of the user, detecting a change in pupil position in relation to the lens to an updated pupil position in relation to the lens, and determining that the updated pupil position is outside a bounding box associated with the lens. The updated pupil position is a replacement pupil position with a replacement pupil position within the bounding box associated with the lens, and the updated pupil position is utilized for eye-tracking functionality. Eye tracking is also performed by determining that a first pixel associated with a gaze direction is outside a visibility region, identifying a replacement pixel within the visibility region, determining an updated gaze angle based on the replacement pixel, and performing eye tracking using the updated gaze angle.

20 Claims, 9 Drawing Sheets

Related U.S. Application Data

(60) Provisional application No. 63/216,855, filed on Jun. 30, 2021.

(51) Int. Cl.
    *G06V 40/18*     (2022.01)
    *G06V 40/19*     (2022.01)

(58) Field of Classification Search
    USPC .................................................. 382/103
    See application file for complete search history.

(56) References Cited

U.S. PATENT DOCUMENTS

| | | | |
|---|---|---|---|
| 10,739,599 B2* | 8/2020 | Shpunt | H04N 13/376 |
| 2015/0347814 A1 | 12/2015 | Sheng | |
| 2018/0032135 A1 | 2/2018 | Rijnders | |
| 2018/0114298 A1* | 4/2018 | Malaika | G02B 27/0093 |
| 2020/0183492 A1 | 6/2020 | Siddiqui | |
| 2020/0326774 A1 | 10/2020 | Hong | |
| 2020/0333609 A1* | 10/2020 | Leister | G03H 1/2294 |

OTHER PUBLICATIONS

Singer, Corten Clemente, and Björn Hartmann. "See-thru: Towards minimally obstructive eye-controlled wheelchair interfaces." Proceedings of the 21st International ACM SIGACCESS Conference on Computers and Accessibility. 2019. (Year: 2019).*

Mardanbegi, Diako, Andrew TN Kurauchi, and Carlos H. Morimoto. "An investigation of the distribution of gaze estimation errors in head mounted gaze trackers using polynomial functions." Journal of Eye Movement Research 11.3 (2018). (Year: 2018).*

Barsingerhorn, et al., "Development and validation of a high-speed stereoscopic eyetracker," Behavior Research Methods (2018) 50:2480-2497, https://doi.org/10.3758/s13428-018-1026-7.

Cazzato, et al., "When I Look into Your Eyes: A Survey on Computer Vision Contributions for Human Gaze Estimation and Tracking," Sensors, 2020, 20, 3739, doi:10.3390/s20133729.

Lupu, et al., "Detection of Gaze Direction by Using Improved Eye-Tracking Technique," IEEE Proceedings of the 37th International Spring Seminar on Electronics Technology, DOI: 10.1109/ISSE.2014.6887611, May 2014.

* cited by examiner

EYE TRACKING DATA FILTERING

BACKGROUND

This disclosure relates generally to image processing. More particularly, but not by way of limitation, this disclosure relates to techniques and systems for generating and managing eye-tracking data for improved eye-tracking techniques.

Eye tracking is a technique utilized in many fields, such as gaze detection, pose estimation, facial analysis and recognition, and the like. Eye tracking often forms the basis of these operations and may be thought of as the process of electronically locating the point of a person's gaze or following and recording the movement of the person's point of gaze. In practice, eye tracking is provided by locating and tracking a pupil location and gaze direction. However, sensors used to track the eye often shift or jitter such that the eye-tracking data is not always perfectly calibrated. Accordingly, the eye-tracking data can be jittery or invalid. What is needed is an improved technique for managing eye-tracking data.

DETAILED DESCRIPTION

Figure 1A:
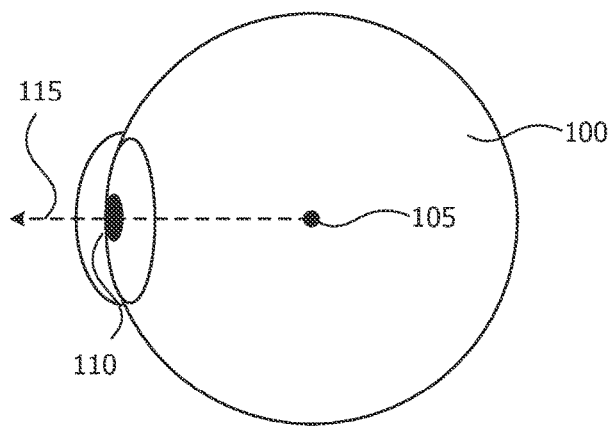
FIGS. 1A-B shows example diagrams of a setup for eye tracking and performing pupil location.

This disclosure pertains to systems, methods, and computer-readable media to refine and smooth eye-tracking data for enhanced performance in eye-tracking techniques.

In one or more embodiments, a pupil position is clamped within a predetermined region. A lens through which a pupil is monitored may have a predetermined region which is a known calibrated region, whereas other regions of the lens may be less calibrated. As such, the pupil location should be maintained within the calibrated region. In one or more embodiments, an initial pupil location is determined in relation to a lens situated in front of the eye. A change in the pupil position may be detected in relation to the lens to an updated pupil position in relation to the lens. If the updated pupil location is outside the determined bounding box, for example, associated with a calibrated region, then a replacement pupil location is selected within the bounding box. The updated pupil location is then used for eye-tracking techniques. In some embodiments, in order to avoid a jitter, the eye-tracking system may change the pupil location over a series of frames such that the pupil location transitions from the original pupil location to the replacement pupil location, for example, based on a time-based easing function.

In one or more embodiments, a gaze direction may be refined for use in eye-tracking techniques. In particular, the gaze direction is refined such that a user is gazing toward a visibility region. A first pixel may be determined as being associated with a gaze direction outside a visibility region. A replacement pixel is identified within the visibility region. The replacement pixel may be selected from along a vector from a center of a field of view to the first pixel. A gaze angle is determined based on a location of the replacement pixel, and an eye-tracking function is performed using the gaze angle.

For purposes of this disclosure, the term "gaze origin" refers to the center of an eye for which gaze is determined.

For purposes of this disclosure, the term "pupil position" refers to the position on the surface of the eye where the pupil is located.

For purposes of this disclosure, the term "gaze direction" is a direction of a gaze originating from the gaze origin and passing through the pupil position.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood, however, that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developer's specific goals (e.g., compliance with system- and business-related constraints) and that these goals may vary from one implementation to another. It will also be appreciated that such development efforts might be complex and time-consuming but would nevertheless be a routine undertaking for those of ordinary skill in the design and implementation of graphics modeling systems having the benefit of this disclosure.

Referring to FIG. 1A, an example diagram of an eye 100 is presented. For purposes of this disclosure, the eye 100 includes a gaze origin 105, which refers to the center of the eye in 3D space. The eye 100 also includes a pupil position 110. The pupil position 110 refers to a position on the surface of the eye 100 where the pupil is located. In one or more embodiments, the pupil position 110 may refer to a central location of the pupil on the surface of the eye. The gaze origin 105 and pupil position 110 may be used to determine a gaze direction 115. The gaze direction 115 may refer to a direction of a gaze originating from the gaze origin 105 and passing through the pupil position 110. In one or more embodiments, the gaze direction 115 may be defined as a vector originating from the gaze origin 105 and passing through the pupil position 110.

Figure 1B:
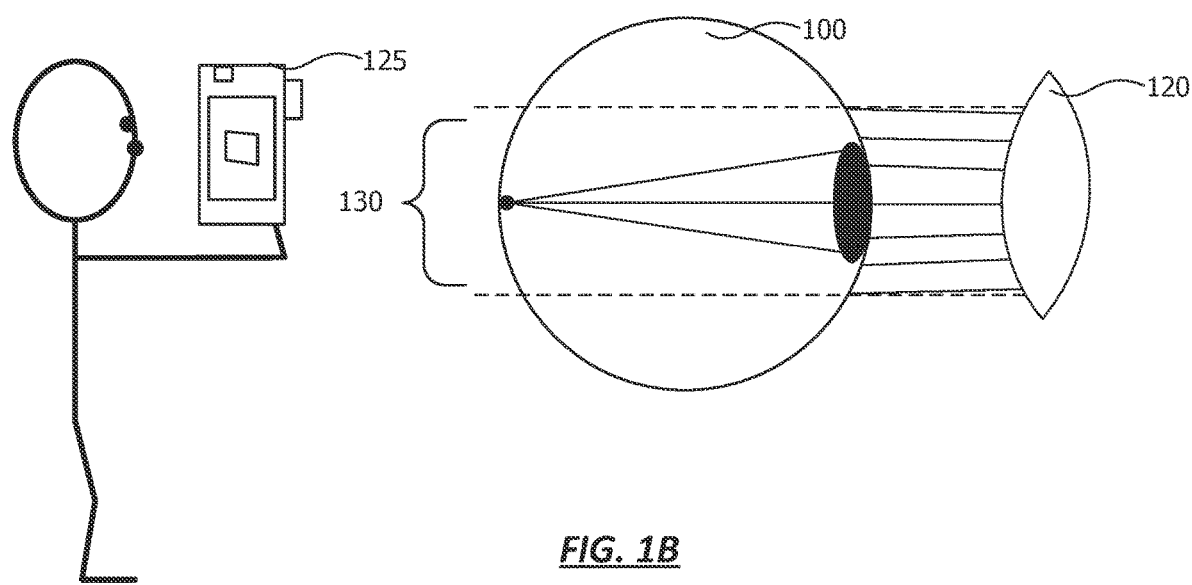

Turning to FIG. 1B, an example diagram of an eye 100 for which eye tracking is being performed. The eye tracking may be performed by a device 125 that includes a lens 120. As the eye 100 looks at an object through the lens 120, only some of the pupil data is valid based on a calibration of the system. The pupil position 110 may affect calibration of the system. For example. hardware restrictions may cause only a portion of the lens 120 to be calibrated, although the pupil position 110 may still reach the uncalibrated portions. Accordingly, the pupil bounds 130 may define a portion of the lens 120 for which pupil data is determined to be valid. In some embodiments, the intersection of the pupil bounds 130 and the lens 120 may identify a bounding box on the lens.

Figure 2:
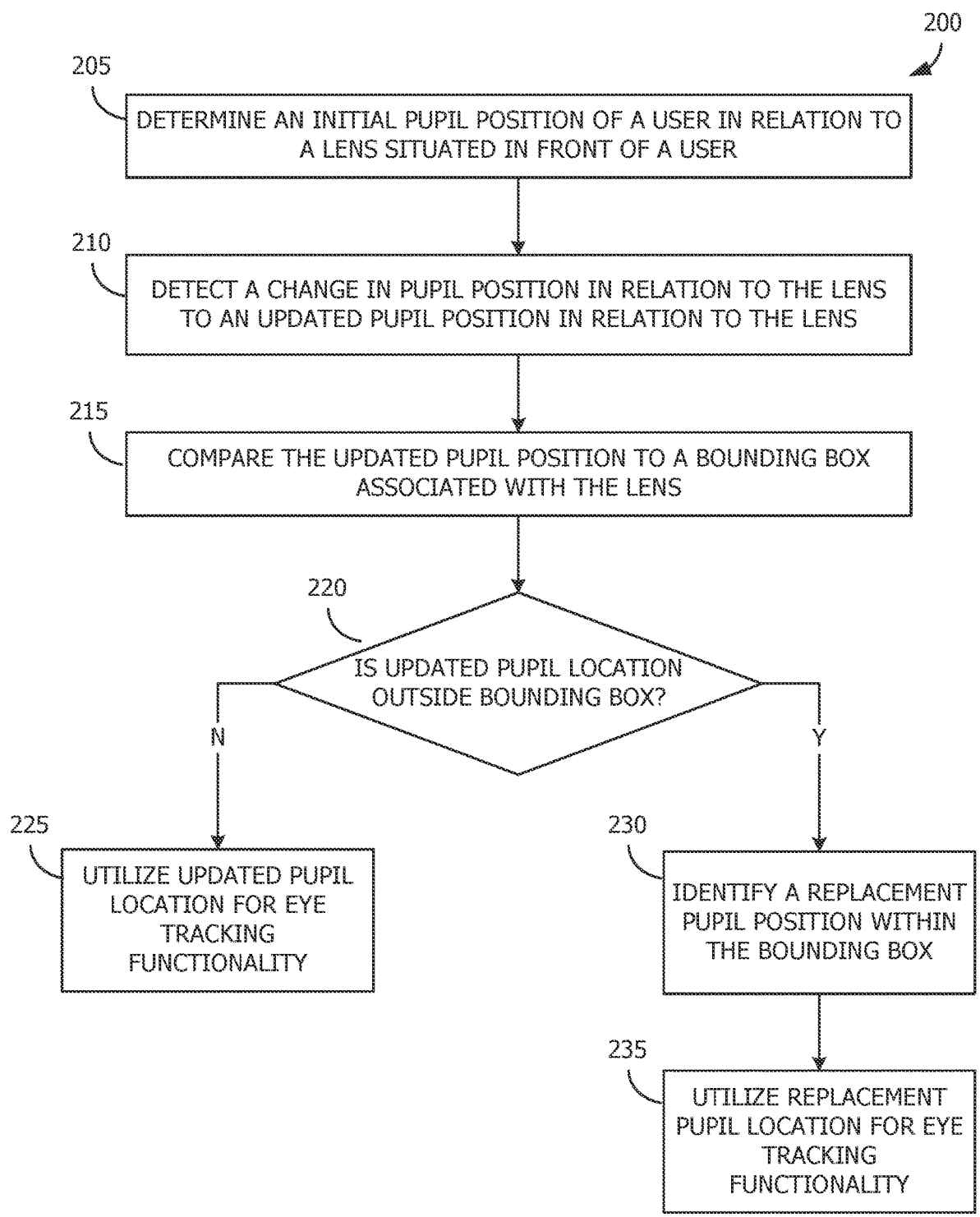
FIG. 2 shows a flowchart of a technique for managing pupil position information for eye-tracking techniques, according to one or more embodiments.

FIG. 2 shows a flowchart of a technique for managing pupil position information for eye-tracking techniques, according to one or more embodiments. Specifically, FIG. 2 depicts a technique for clamping pupil position to within a bounding box of a lens. By clamping the pupil position to a portion of the lens determined to provide valid pupil data, the system can avoid having to extrapolate data from uncalibrated portions of the lens, causing the image to look more distorted than it would within the bounding box. For example, if a display device moves or is shifted while in front of the eye, the pupil position may shift frequently, causing jitters in presentation on the screen. Although the various process depicted in FIG. 2 are illustrated in a particular order, it should be understood that the various processes described may be performed in a different order. Further, not all of the various processes may be necessary to be performed.

The flowchart 200 begins at 205, where an initial pupil position of a user is determined in relation to a lens situated in front of a user. For example, the lens may be situated in front of the eye of the user for which the initial pupil position is determined. The flowchart 200 continues at 210 where a change in pupil position is detected in relation to the lens. As a result, an updated pupil position is determined in relation to the lens.

At block 215, the updated pupil position is compared to a bounding box associated with the lens. As described above, the bounding box may refer to a portion of the lens which is determined to provide valid pupil data. The bounding box may be determined, for example, by an intersection of valid pupil bounds and the lens, as described above with respect to FIG. 1B.

The flowchart continues at 220, where a determination is made regarding whether the updated pupil location is outside the bounding box. If at 220 a determination is made that the updated pupil location is not outside the bounding box, then the flowchart proceeds to 225, and the updated pupil location is utilized for eye-tracking functionality as-is.

Returning to 220, if a determination is made that the pupil location is outside the bounding box, then the flowchart continues to block 230. At block 230, a replacement pupil position is identified within the bounding box. The replacement pupil position may be determined in a number of ways. For example, a nearest pupil position within the bounding box may be used. As an example, a location on the boundary of the bounding box may be used. Then, the flowchart concludes at block 235 where the replacement pupil location is used for eye-tracking functionality. Specifically, in some embodiments, the replacement pupil location is used to calculate a warping function for presentation of an image on the screen, as described above with respect to FIG. 1B.

Figure 3:
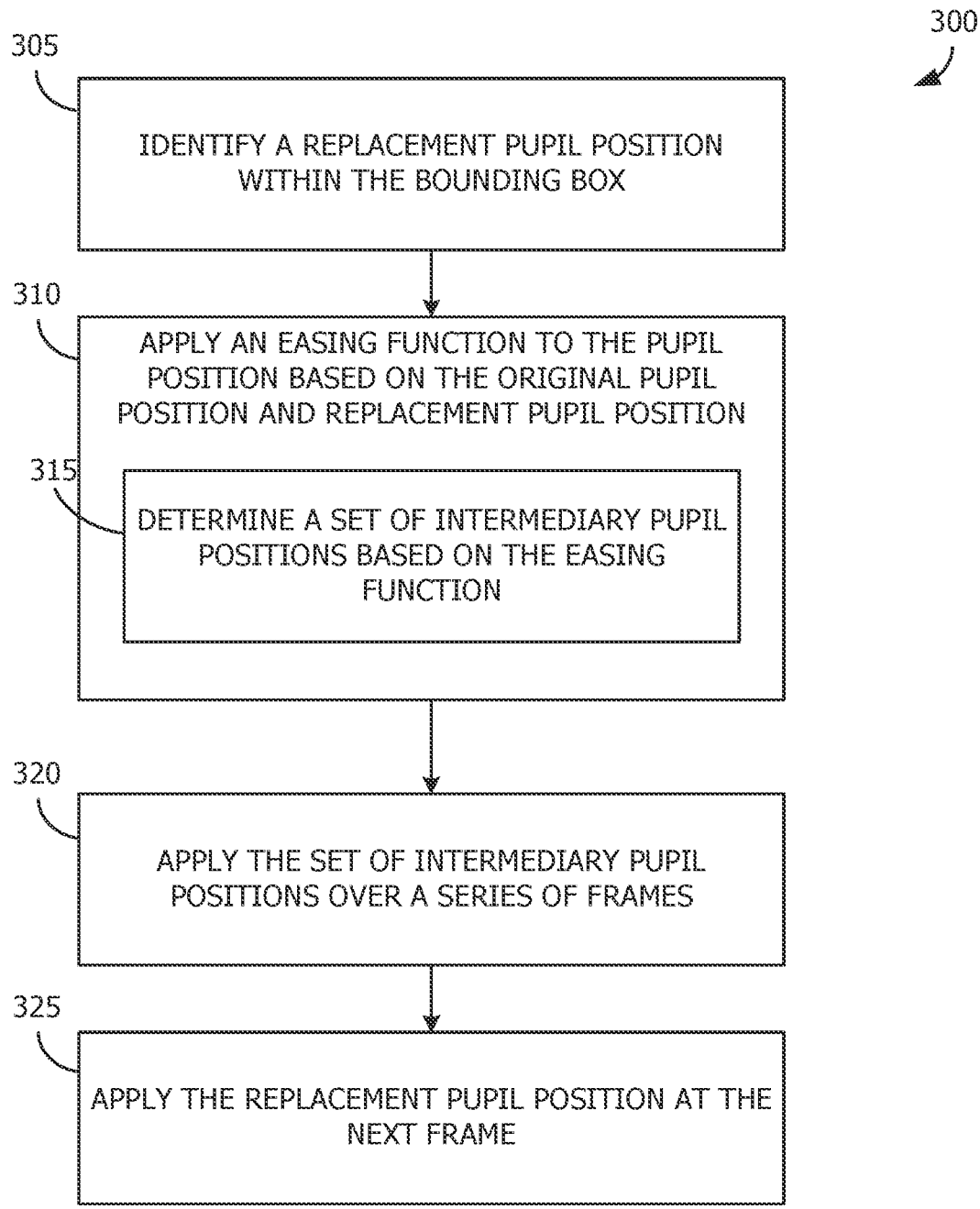
FIG. 3 shows a flowchart of a technique for refining a pupil position for eye tracking, according to one or more embodiments.

In some embodiments, utilizing the replacement pupil position may cause a jump in the data as the eye moves. For example, the jump in the data may lead to a jump in distortion. In some embodiments, the jump in distortion may be avoided by applying an easing function to the pupil position. FIG. 3 shows a flowchart of a technique for refining a pupil position for eye tracking, or example, as described at block 230 of FIG. 2 above, according to one or more embodiments. Although the various processes depicted in FIG. 3 are illustrated in a particular order, it should be understood that the various processes described may be performed in a different order. Further, not all of the various processes may be necessary to be performed.

The flowchart 300 begins at 305 where a replacement pupil position is identified within a bounding box. According to one or more embodiments, the replacement pupil position may be selected based on a nearest location within a bounding box from an actual pupil position. In some embodiments, the replacement pupil position may be selected as a location on a boundary of the bounding box.

The flowchart continues at block 310 where an easing function is applied to the pupil position based on the actual pupil position and the replacement pupil position. In some embodiments, the easing function may be a time-based function. Accordingly, at block 315, rather than simply replacing the actual pupil location with a replacement pupil location, a set of intermediary pupil positions may be determined based on the easing function. According to one or more embodiments, the easing function may be a linear function, a cubic easing function, or the like. As such, the set of intermediary pupil positions may ease the user's pupil position to the replacement pupil position.

The flowchart 300 continues at block 320, where the set of intermediary pupil positions are applied over a series of frames. For example, the set of intermediary pupil positions may include a predetermined number of intermediary pupil positions, which may correspond to a number of frames over which the intermediary pupil positions are applied. Alternatively, in some embodiments, the number of intermediary pupil positions may be driven by a difference in the actual pupil position and the replacement pupil position. For example, if the linear difference between the actual pupil position and the replacement pupil position is small, then fewer frames may be needed and thus fewer intermediary values to reach the replacement pixel location. By contrast, if the linear difference between the actual pupil position and the replacement pupil position is large, then more frames may be needed and thus more intermediary values to reach the replacement pupil position in order to ease the user in effectively. The set of intermediary pupil positions is applied such that the subsequent series of frames presented to the user may utilize the progression of intermediary pupil positions over the series of frames.

The flowchart 300 concludes at block 325, where the replacement pupil position is used in the next frame. That is, after the set of intermediary pupil positions are utilized over a series of frames to be rendered based on the replacement pupil position rather than the actual pupil position. In some embodiments, the replacement pupil position may then be used to render content for presentation to the user until a new pupil position is detected, at which time the process described in FIG. 2 begins again.

Figure 4A:
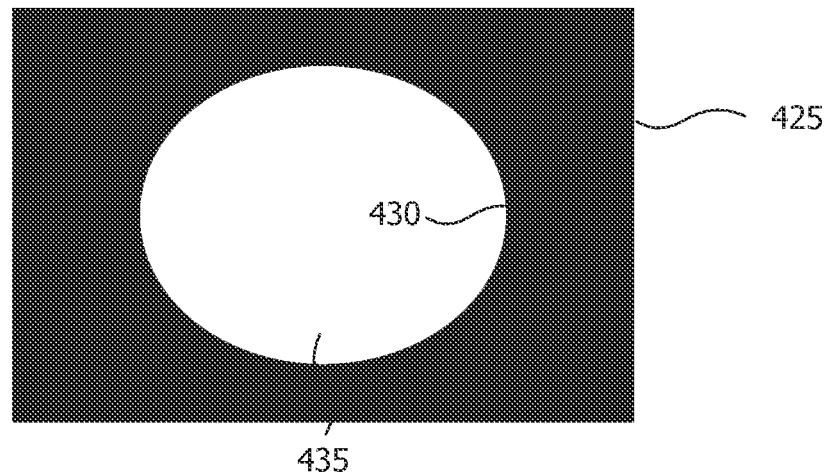
FIGS. 4A-B show example diagrams of a gaze direction with respect to a visibility region, according to one or more embodiments.

According to some embodiments, other issues with may occur, for example, based on user gaze. For example, a display may have a region associated with a region that includes valid pixel information. Accordingly, a gaze direction may be refined to ensure that a user is gazing at a pixel within a valid visibility region. Referring to FIG. 4A, a simplified block diagram of a screen, such as screen 425, is presented. The screen 425 may be any kind of display situated in front of a user, such as in a mobile device, such as a tablet or mobile phone, or a head-mounted display device. A portion of the display may be visible, and thereby referred to as a visibility region. In some embodiments, the visibility region is a portion of the screen visible through a lens 430. As such, the lens does not "see" every portion of the display. In addition, not all of the screen 425 that is visible through the lens 430 may include valid data. For example, the outer portions of the lens 430 may be difficult to calibrate or may otherwise not be calibrated. As such, the screen 425 may include a visibility region 435, which is determined to contain valid pixel data. Additionally, or alternatively, the determination of the region which is visible may be based on what is viewable by hardware, technical specifications of the eye-tracking system, or a software-defined region.

Figure 4B:
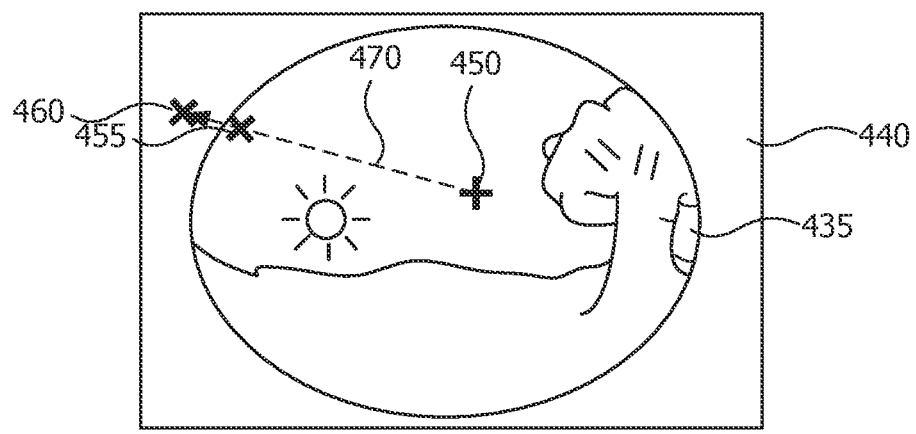

Turning to FIG. 4B, the figure depicts an example view of a screen from an eye. According to some embodiments, the visibility region 435 may be defined by a visibility mask, based on a portion of the screen determined to provide valid pixel data. As such, if a user's gaze is directed outside the visibility region 435, then a replacement gaze location may be utilized. As shown, the user's gaze 460 is directed outside the visibility region 435 but within the screen 440. The screen 440 may be a screen of a mobile device situated in front of a user, such as a tablet, mobile phone, wearable device, or the like. In order to provide valid data, a replacement gaze location may be selected from within the visibility region. The replacement pixel may be selected, for example, based on a closest pixel within the visibility region 435. In some embodiments, the replacement pixel may be selected by identifying a center of a field of view 450. The center of the field of view 450 may be based on a location of an eye with respect to the screen. The center of the field of view 450 may be based on a location of the center of the user's eye in relation to the screen. In some embodiments, a replacement pixel 455 for the gaze target 460 may be selected such that the replacement pixel 455 is within the visibility region. The replacement pixel may be determined from along a vector 470 originating from the center of the field of view 450 and directed toward the target location of the gaze 460. According to one or more embodiments, the replacement pixel 455 may then be used for eye-tracking techniques. Further, in some embodiments, eye-tracking techniques may also rely on a gaze angle, which may be determined based on the replacement pixel 455.

Figure 5A:
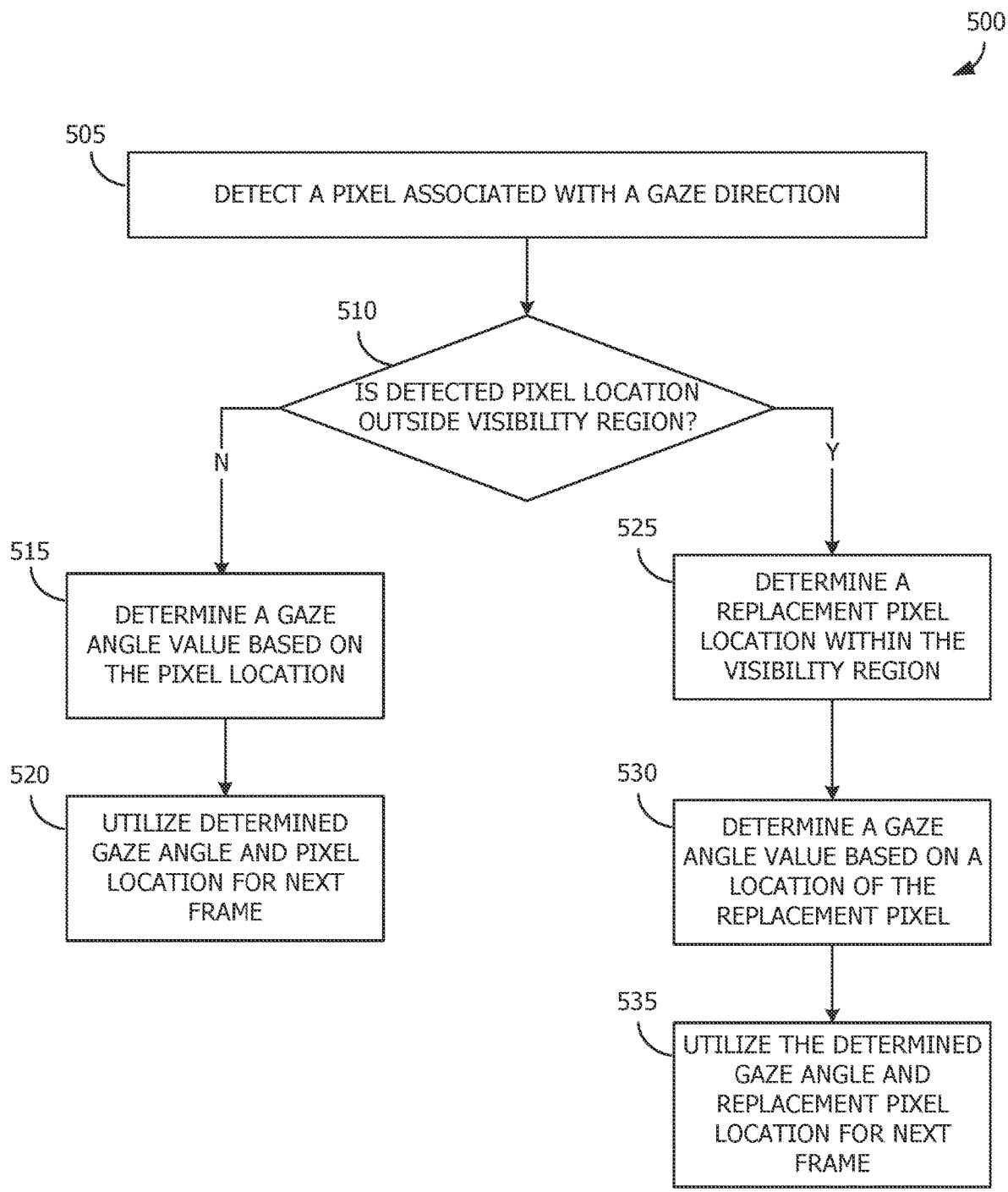
FIGS. 5A-B show flowcharts of techniques for refining a gaze angle for eye-tracking techniques, according to one or more embodiments.

FIG. 5A shows a flowchart of a technique for managing gaze information for eye-tracking techniques, according to one or more embodiments. Specifically, FIG. 5A depicts a technique for recalculating a gaze direction of a user in order to utilize valid pixel data. For purposes of clarity, the description of FIG. 3 is described with respect to FIGS. 1 and 4 as described above. Although the various process depicted in FIG. 5 are illustrated in a particular order, it should be understood that the various processes described may be performed in a different order. Further, not all of the various processes may be necessary to be performed.

The flowchart 500 begins at block 505 where a pixel location is detected as being associated with a gaze direction. For example, the pixel location may be associated with a target location of a user's gaze. The pixel location may be determined with respect to a screen situated in front of an eye 100 of a user. At block 510, a determination is made regarding whether the detected pixel location is outside a visibility region. As described above with respect to FIG. 4B, the visibility region 435 may be a subset of the screen 425 which includes valid pixel data. The valid pixel data may be based on a subset of the lens 430 through which the screen 425 is visible.

If a determination is made that the pixel location is not outside the visibility region at block 510, then the flowchart 500 continues to block 515. At block 515, a gaze angle value is determined based on the detected pixel location. The gaze angle may describe an angle between a user's eye and the screen according to the determined pixel location. The flowchart concludes at block 520 where the determined gaze angle and pixel location is utilized for processing the next frame.

Returning to block 510 of flowchart 500, if a determination is made that the detected pixel location is outside the visibility region, then the flowchart 500 continues at block 525. At block 525, a replacement pixel location is determined within the visibility region. In one or more embodiments, the replacement pixel may be selected, for example, as a nearest pixel within the visibility region to the detected pixel. Further, in some embodiments, the replacement pixel location may be selected based on a center point of a field of view, as will be described in greater detail below with respect to FIG. 6.

The flowchart 500 continues at block 530 where a gaze angle is determined based on the location of the replacement pixel. The gaze angle may describe an angle between a user's eye and the screen according to the determined replacement pixel location. The flowchart concludes at block 535 where the determined gaze angle and the replacement pixel location is utilized for processing the next frame.

Figure 5B:
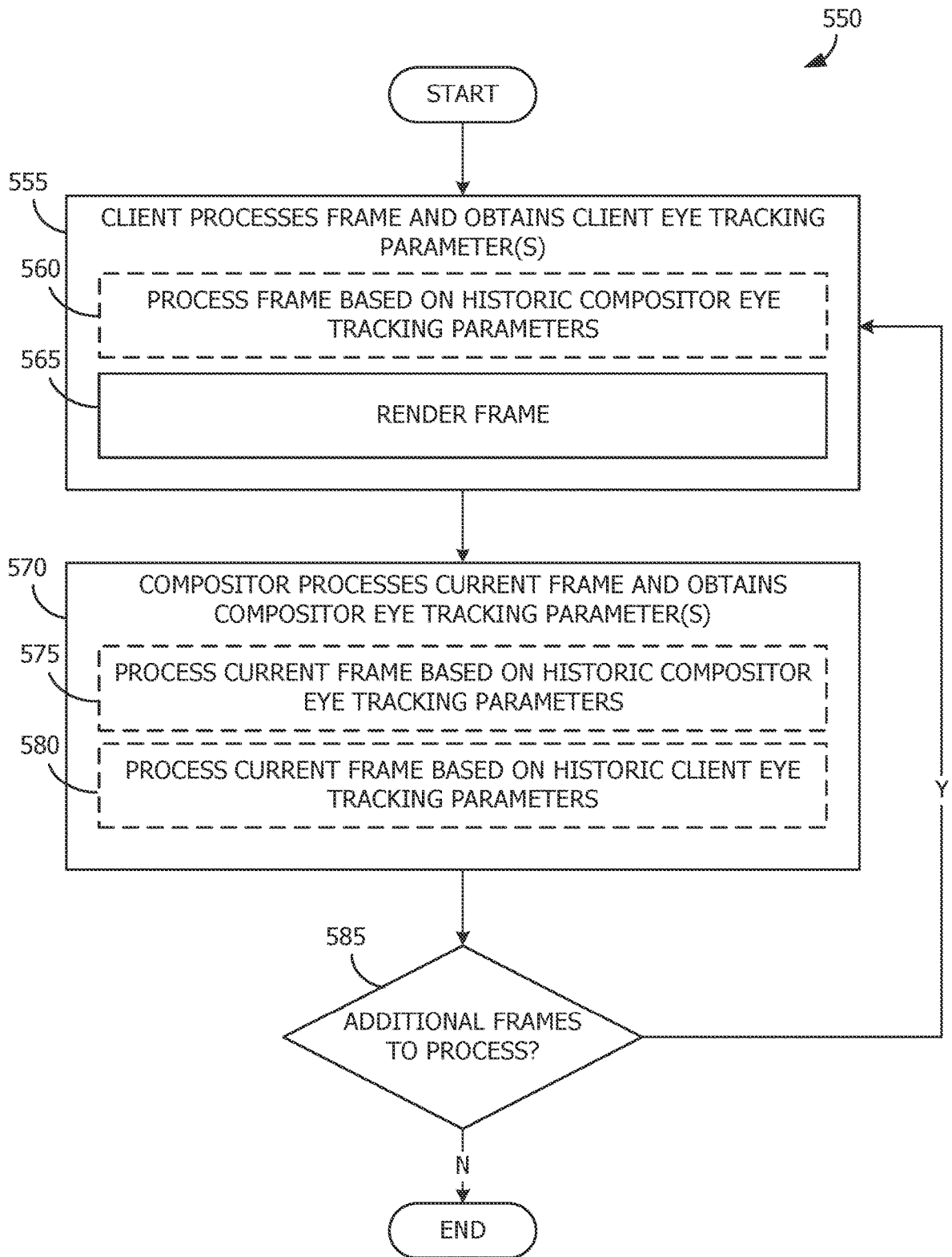

According to some embodiments, eye tracking data may be used for rendering frames in a two-phase process by a client and compositor. In some embodiments, eye tracking data can be passed between the client and compositor, and/or historic eye tracking data can be used to improve visual quality and/or satisfying hardware constraints. In particular, consistency between the client and compositor may be improved by sharing at least some eye tracking parameters between the two. FIG. 5B shows a flowchart of a technique for managing eye tracking data, according to one or more embodiments. Specifically, FIG. 5B depicts a technique for sharing eye tracking data between a client and a compositor. For purposes of clarity, the description of FIG. 3 is described with respect to FIGS. 1 and 4 as described above. Although the various process depicted in FIG. 5B are illustrated in a particular order, it should be understood that the various processes described may be performed in a different order. Further, not all of the various processes may be necessary to be performed. The flowchart begins at block 555 at which the client processes a frame and obtains eye tracking parameters. In some embodiments, the client renders a frame for presentation by a compositor. According to some embodiments, the client determines certain eye tracking parameters, such as a gaze angle, when the frames are rendered. As shown at block 560, in an optional step, the client processes the frame based on historic compositor eye tracking parameters. That is, the compositor passes data related to a current gaze angle and/or the visibility region from a most recently presented frame back to the client for processing of future frames. Then, at block 565, the client renders the frame. By utilizing the visibility region passed by the compositor to the client, the client can avoid rendering pixels outside the visibility region, thus improving performance. By utilizing the gaze angle passed by the compositor, the client can render the frame more appropriately to the user's gaze, thereby improving image quality.

The flowchart 550 continues at 570, where a compositor presents the rendered frame and, in the process, obtains compositor eye tracking parameters. In particular, the compositor can perform the steps described with respect to FIG. 5A above. For example, the compositor can obtain a gaze angle value and a pixel location or replacement pixel location based on the visibility region. According to one or more embodiments, the gaze for which the gaze angle is obtained is from a separate gaze tracker. This gaze angle, pixel location, and visibility region can be considered the compositor eye tracking parameters, either individually or in some combination. According to some embodiments, the compositor uses the various eye tracking parameters to generate a frame in accordance with the gaze angle and visibility region.

According to some embodiments, the compositor can optionally process the current frame based on historic client data from a client rendering frames being presented by the compositor. As such, at block 575, the compositor optionally processes the current frame based on historic compositor eye tracking parameters. That is, the eye tracking data, such as the gaze angle and/or the visibility region can be utilized from one frame to another. Doing so may reduce latency in processing consecutive frames, in some embodiments.

Optionally, as shown at block 580, in some embodiments the compositor processes the current frame based on the historic client eye tracking parameters. That is, in some embodiments, the client can pass data used during rendering a previous frame to the compositor for processing additional frames. For example, a gaze angle used during rendering can be transmitted to the client with the rendered frame. As such, the replacement pixel location and gaze angle, as described above with respect to FIGS. 4B and 5A will be more efficiently determined and/or latency improved depending upon the shared data.

The flowchart continues at block 585. If there are additional frames to process, then the flowchart returns to block 555 and the client processes additional frames, optionally based on eye tracking parameters passed from the compositor, until no additional frames are processed.

Figure 6:
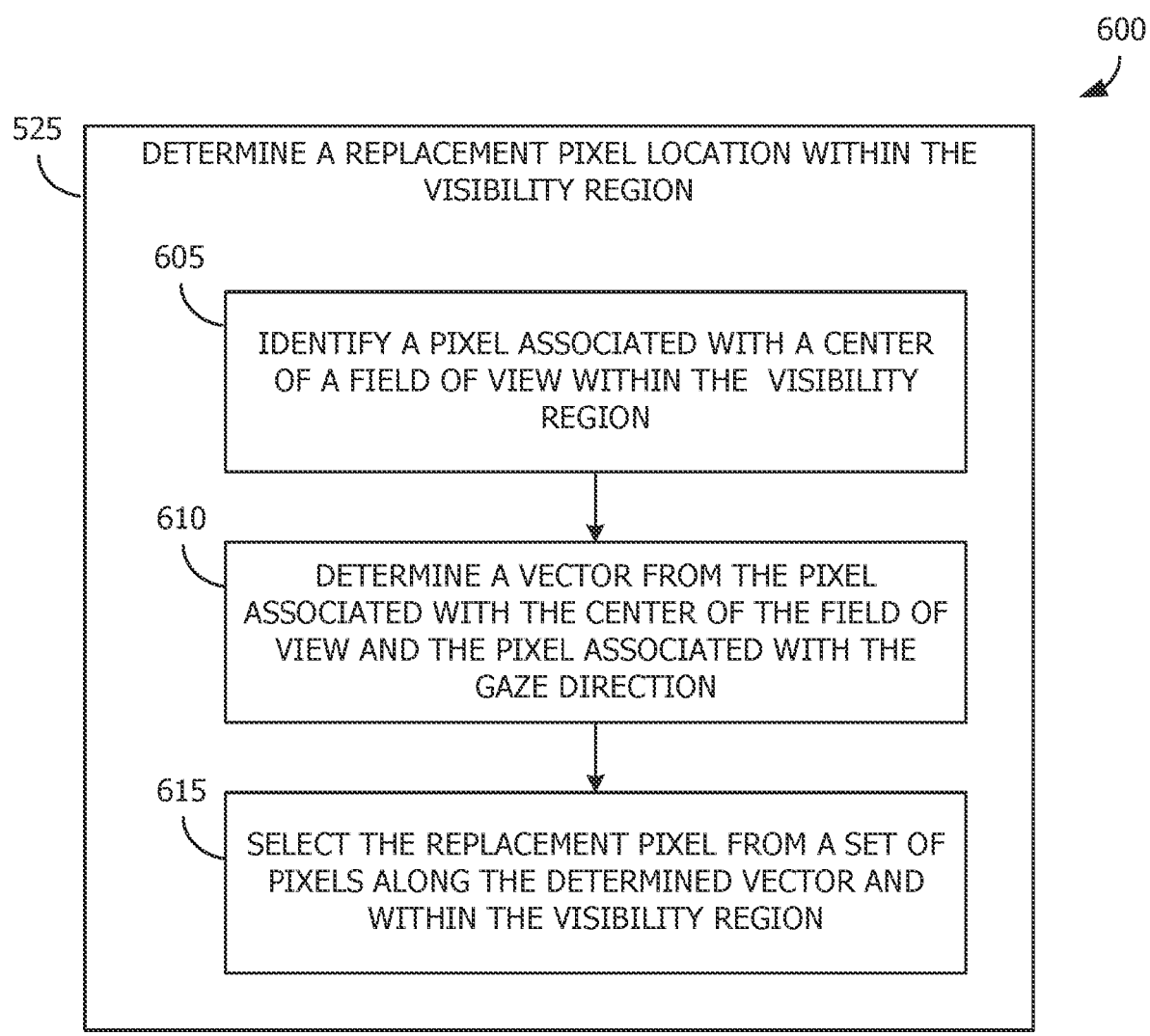
FIG. 6 shows a flowchart of a technique for identifying a replacement pixel to refine a gaze angle, according to one or more embodiments.

FIG. 6 depicts a flowchart for selecting an updated pixel location in accordance with one or more embodiments. In particular, the flowchart 600 shows an example technique for determining a replacement pixel location, in accordance with some embodiments. For purposes of clarity, the description of FIG. 6 is described with respect to FIGS. 1 and 4 as described above. Although the various process depicted in FIG. 6 are illustrated in a particular order, it should be understood that the various processes described may be performed in a different order. Further, not all of the various processes may be necessary to be performed.

The flowchart 600 begins at 605 where a pixel associated with a center of a field of view is identified within the visibility region. The center of the field of view may be a pixel on the screen situated in front of the eye and may be determined based on a vector originating from a center of the eye and extending to the surface of the screen in a perpendicular manner. Accordingly, the center of the field of view may be positioned at or offset from a center of the screen or a pixel associated with a center of a lens between the screen and the eye.

The flowchart 600 continues at 610 where a vector is determined from the pixel associated with the center of the field of view and the pixel associated with the gaze direction. The pixel associated with the gaze direction may be determined as described above with respect to block 505 of flowchart 500. The flowchart 600 concludes at block 615 where the replacement pixel is selected from a set of pixels along the determined vector and within the visibility region.

According to some embodiments, the system setup may be configured to track two eyes. If valid data is not available for one eye, the system may be configured to predict a gaze of the eye with invalid data using the other eye. For example, gaze data may be obtained for each eye. If a determination is made that one of the sets of gaze data includes invalid data, then a prediction model may be applied to the other set of gaze data to predict the missing gaze data. The set of gaze data may be determined to be invalid, for example, based on hardware or software feedback, based on a review for data consistency between the eyes, based on a threshold movement within expected movements, and the like. In some embodiments, a gaze direction may be determined based on content being presented. For example, if an object is presented to the user and one eye is determined to be looking just outside the object, or within a threshold distance of the object, then the gaze may be "clamped" to the object. Similarly, scene depth may be used to determine where a user is looking and ensuring that the two eyes are looking at something at the same depth. In some embodiments, an eye model and pupil diameter may be used to determine the depth at which an eye is looking.

Figure 7:
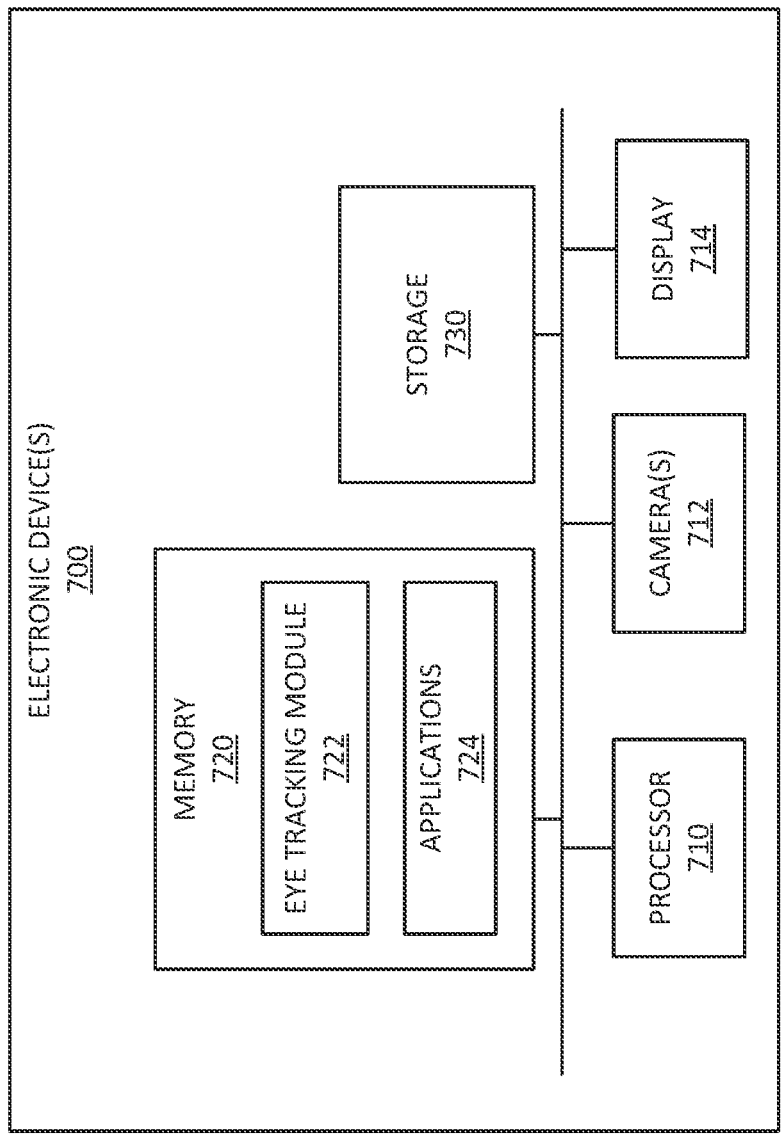
FIG. 7 shows, in block diagram form, a multifunction electronic device in accordance with one or more embodiments.

Turning to FIG. 7, an electronic device 700 is presented, in accordance with one or more embodiments of the disclosure. Electronic device 700 may be part of a multifunctional device, such as a mobile phone, tablet computer, personal digital assistant, portable music/video player, wearable device, base station, laptop computer, desktop computer, network device, or any other electronic device. Electronic device 700 is generally used to for eye tracking, for example, in the context of an XR application. It should be understood that the various components of electronic device 700 may be differently distributed within the device or may be distributed across additional devices, such as additional client devices, network devices, and the like.

Electronic Device 700 may include processor 710, such as a central processing unit (CPU). Processor 710 may be a system-on-chip such as those found in mobile devices and include one or more dedicated graphics processing units (GPUs). Further, processor 710 may include multiple processors of the same or different type. Electronic device 700 may also include a memory 720. Memory 720 may include one or more different types of memory, which may be used for performing device functions in conjunction with processor 710. For example, memory 720 may include cache, read-only memory (ROM), random access memory (RAM), or any kind of transitory or non-transitory computer-readable storage medium capable of storing computer-readable code. Memory 720 may store various programming modules for execution by processor 710, including an eye-tracking module 722, as well as other applications 724. Electronic device 700 may also include storage 730. Storage 730 may include one more non-transitory computer-readable mediums, including, for example, magnetic disks (fixed, floppy, and removable) and tape, optical media such as CD-ROMs and digital video disks (DVDs), and semiconductor memory devices such as Electrically Programmable Read-Only Memory (EPROM) and Electrically Erasable Programmable Read-Only Memory (EEPROM). Storage 730 may include, for example, data used for performing eye-tracking techniques or data for presenting information to a user for which eye-tracking techniques are utilized.

Electronic device 700 may also include one or more cameras 712 or other sensors, such as a depth sensor, from which depth of a scene may be determined. In one or more embodiments, each of the one or more cameras 712 may be a traditional RGB camera or a depth camera. Further, cameras 712 may include a stereo camera or other multi-camera system, a time-of-flight camera system, or the like which capture images from which depth information of a scene may be determined. In some embodiments, the one or more cameras 712 may be cameras used for eye tracking. Electronic device 700 may allow a user to interact with XR environments. There are many different types of electronic systems that enable a person to sense and/or interact with various XR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 8:
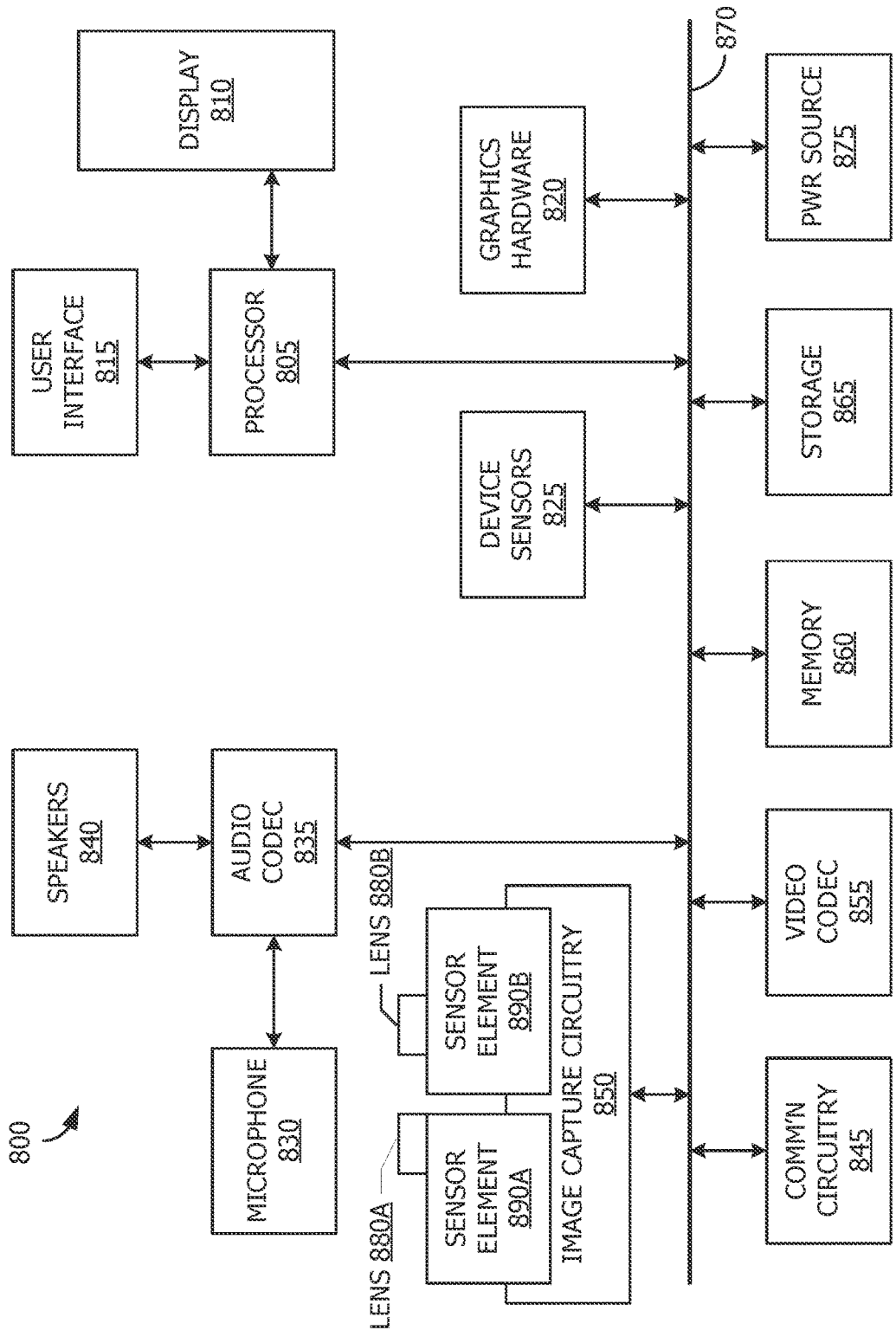
FIG. 8 shows, in block diagram form, a computer system in accordance with one or more embodiments.

Referring now to FIG. 8, a simplified functional block diagram of illustrative multifunction electronic device 800 is shown according to one embodiment. Each of electronic devices may be a multifunctional electronic device or may have some or all of the described components of a multifunctional electronic device described herein. Multifunction electronic device 800 may include processor 805, display 810, user interface 815, graphics hardware 820, device sensors 825 (e.g., proximity sensor/ambient light sensor, accelerometer and/or gyroscope), microphone 830, audio codec(s) 835, speaker(s) 840, communications circuitry 845, digital image capture circuitry 850 (e.g., including camera system), video codec(s) 855 (e.g., in support of digital image capture unit), memory 860, storage device 865, and communications bus 870. Multifunction electronic device 800 may be, for example, a digital camera or a personal electronic device, such as a personal digital assistant (PDA), personal music player, mobile telephone, or a tablet computer.

Processor 805 may execute instructions necessary to carry out or control the operation of many functions performed by device 800 (e.g., such as the generation and/or processing of images as disclosed herein). Processor 805 may, for instance, drive display 810 and receive user input from user interface 815. User interface 815 may allow a user to interact with device 800. For example, user interface 815 can take a variety of forms, such as a button, keypad, dial, a click wheel, keyboard, display screen and/or a touch screen. Processor 805 may also, for example, be a system-on-chip such as those found in mobile devices and include a dedicated GPU. Processor 805 may be based on reduced instruction-set computer (RISC) or complex instruction-set computer (CISC) architectures or any other suitable architecture and may include one or more processing cores. Graphics hardware 820 may be special purpose computational hardware for processing graphics and/or assisting processor 805 to process graphics information. In one embodiment, graphics hardware 820 may include a programmable GPU.

Image capture circuitry 850 may include two (or more) lens assemblies 880A and 880B, where each lens assembly may have a separate focal length. For example, lens assembly 880A may have a shorter focal length than lens assembly 880B. Each lens assembly may have a separate associated sensor element 890A or 890B. Alternatively, two or more lens assemblies may share a common sensor element. Image capture circuitry 850 may capture still and/or video images. Output from image capture circuitry 850 may be processed, at least in part, by video codec(s) 855 and/or processor 805 and/or graphics hardware 820, and/or a dedicated image processing unit or pipeline incorporated within circuitry 850. Images captured may be stored in memory 860 and/or storage 865.

Sensor and camera circuitry 850 may capture still and video images that may be processed in accordance with this disclosure, at least in part, by video codec(s) 855 and/or processor 805 and/or graphics hardware 820, and/or a dedicated image processing unit incorporated within circuitry 850. Images so captured may be stored in memory 860 and/or storage 865. Memory 860 may include one or more different types of media used by processor 805 and graphics hardware 820 to perform device functions. For example, memory 860 may include memory cache, ROM, and/or RAM. Storage 865 may store media (e.g., audio, image and video files), computer program instructions or software, preference information, device profile information, and any other suitable data. Storage 865 may include one more non-transitory computer-readable storage mediums, including, for example, magnetic disks (fixed, floppy, and removable) and tape, optical media such as CD-ROMs and digital video disks (DVDs), and semiconductor memory devices such as Electrically Programmable Read-Only Memory (EPROM) and Electrically Erasable Programmable Read-Only Memory (EEPROM). Memory 860 and storage 865 may be used to tangibly retain computer program instructions or code organized into one or more modules and written in any desired computer programming language. When executed by, for example, processor 805, such computer program code may implement one or more of the methods described herein.

A physical environment refers to a physical world that people can sense and/or interact with without aid of electronic devices. The physical environment may include physical features, such as a physical surface or a physical object. For example, the physical environment corresponds to a physical park that includes physical trees, physical buildings, and physical people. People can directly sense and/or interact with the physical environment, such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

It is to be understood that the above description is intended to be illustrative and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 2-3 and 5-6 or the arrangement of elements shown in FIGS. 1, 4, and 7-8 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain English equivalents of the respective terms "comprising" and "wherein."

The invention claimed is:

1. A method comprising:
   detecting a change in pupil position of a user in relation to a lens to an updated pupil position;
   determining that the updated pupil position corresponds to an uncalibrated portion of the lens for eye tracking;
   replacing the updated pupil position with a replacement pupil position that corresponds to a calibrated portion of the lens; and
   utilizing the updated pupil position for eye-tracking functionality.

2. The method of claim 1, further comprising:
   presenting a frame to the user based on the updated pupil position.

3. The method of claim 2, wherein image content of the frame is distorted in accordance with the updated pupil position.

4. The method of claim 2, wherein the replacement pupil position is determined by applying an easing function from an initial pupil position to the replacement pupil position over a series of frames.

5. The method of claim 4, wherein the easing function comprises a time-based easing function, and wherein the replacement pupil position is reached over the series of frames.

6. The method of claim 1, wherein the calibrated portion of the lens is determined in accordance with calibration information for the lens.

7. The method of claim 1, wherein the calibrated portion of the lens is a predetermined region of the lens.

8. A non-transitory computer-readable medium comprising computer-readable code executable by one or more processors to:
   detect a change in pupil position of a user in relation to a lens to an updated pupil position;
   determine that the updated pupil position corresponds to an uncalibrated portion of the lens for eye tracking;
   replace the updated pupil position with a replacement pupil position that corresponds to a calibrated portion of the lens; and
   utilize the updated pupil position for eye-tracking functionality.

9. The non-transitory computer-readable medium of claim 8, further comprising computer-readable code to:
   present a frame to the user based on the updated pupil position.

10. The non-transitory computer-readable medium of claim 9, wherein image content of the frame is distorted in accordance with the updated pupil position.

11. The non-transitory computer-readable medium of claim 9, wherein the computer-readable code to replace the updated pupil position with a replacement pupil position comprises computer readable code to apply an easing function from an initial pupil position to the replacement pupil position over a series of frames.

12. The non-transitory computer-readable medium of claim 11, wherein the easing function comprises a time-based easing function, and wherein the replacement pupil position is reached over the series of frames.

13. The non-transitory computer-readable medium of claim 8, wherein the calibrated portion of the lens is determined in accordance with calibration information for the lens.

14. The non-transitory computer-readable medium of claim 8, wherein the calibrated portion of the lens is a predetermined region of the lens.

15. A system comprising:
   one or more processors; and
   one or more computer-readable media comprising computer-readable code executable by the one or more processors to:
      detect a change in pupil position of a user in relation to a lens to an updated pupil position;
      determine that the updated pupil position corresponds to an uncalibrated portion of the lens for eye tracking;

replace the updated pupil position with a replacement pupil position that corresponds to a calibrated portion of the lens; and utilize the updated pupil position for eye-tracking functionality.

16. The system of claim 15, further comprising computer-readable code to:

present a frame to the user based on the updated pupil position.

17. The system of claim 16, wherein image content of the frame is distorted in accordance with the updated pupil position.

18. The system of claim 16, wherein the computer-readable code to replace the updated pupil position with a replacement pupil position comprises computer readable code to apply an easing function from an initial pupil position to the replacement pupil position over a series of frames.

19. The system of claim 18, wherein the easing function comprises a time-based easing function, and wherein the replacement pupil position is reached over the series of frames.

20. The system of claim 15, wherein the calibrated portion of the lens is determined in accordance with calibration information for the lens.

\* \* \* \* \*